United States Patent Office 3,513,028
Patented May 19, 1970

3,513,028
FUEL CELL COMPRISING AN ELECTRODE CONTAINING A TRANSITION METAL BORIDE AND A METHOD OF MAKING A FUEL CELL ELECTRODE CONTAINING A COATING OF TRANSITION METAL BLACK
Mark Salomon, Ottawa, Ontario, Canada, assignor to Leesona Corporation, Warwick, R.I., a corporation of Massachusetts
No Drawing. Filed Apr. 20, 1964, Ser. No. 361,293
Int. Cl. H01m 27/00
U.S. Cl. 136—86                              9 Claims This invention is directed to improved fuel cell electrodes, and more particularly, to fuel cell electrodes comprising a metal boride and to fuel cells employing such electrodes. These electrodes have excellent corrosion resistance, are relatively inexpensive to manufacture, and possess good electro-chemical activity.

A fuel cell, as the term is employed herein, comprises an electro-chemical cell operated directly upon a fuel and oxidant, wherein the free energy of combustion of the fuel is converted directly into electrical energy. The cell, in its simplest concept, comprises a housing, an oxidizing electrode, a fuel electrode, and an electrolyte. It is necessary that the fuel and oxident come in contact with their respective electrodes, where a process of adsorption and de-adsorption occurs leaving the electrodes electro-chemically charged. The electric current is withdrawn from the cell and passed through a suitable load where work is accomplished.

In the prior art, various electrode structures have been utilized in an effort to obtain a commercially feasible cell capable of producing low voltage direct current electrical energy. Such cells preferably should be constructed from relatively low-cost materials and operated on conventional fuels. Further, the components of the cell must be highly resistant to corrosion in order to withstand the corrosive nature of the electrolyte, and cannot undergo chemical change at the operating temperature of the cell. Therefore, extensive research has been carried out to obtain electrodes meeting the above requirement, which will sustain high current densities at low temperatures.

One prior art electrode is described by Francis T. Bacon in U.S. Pat. No. 2,716,670 comprising oxides of nickel and lithium. The electrode is prepared by soaking a sintered nickel plate in a solution of lithium hydroxide at room temperature, drying at a temperature of about 125° C. and thereafter oxidizing by heating in air at about 800° C. The resultant electrode has a highly conductive and corrosion resistant lithium-nickel oxide layer deposited on the pore surfaces of a porous nickel structure. Although these electrodes have relatively good electro-chemical properties, it is necessary that they be operated at relatively high temperatures, i.e., from about 225 to 500° F., in order to obtain sufficient reactivity. Moreover, at such temperatures, the corrosion-resistance of the components of the cell are lowered.

A second prior art electrode is described by Justi in U.S. Pat. No. 2,928,891 comprising a carrier skeleton having metallic conductivity and from 20–80 percent by weight Raney catalyst granules embedded therein. The electrode is formed by pressing powdered carbon or a lye-resistant powdered metal capable of forming a sinterable mixture with a powdered Raney alloy under a pressure of about 3,000 to 7,000 kilograms per square centimeter, sintering the pressed mass at a temperature between about 600–1,000° C. and thereafter, contacting the sintered mass with lye to dissolve the inactive component of the Raney alloy, thus forming an electrode containing a Raney catalyst. Although the Justi-type electrodes have good electro-chemical activity, they are susceptible to the corrosive environments of a fuel cell and therefore, have only a relatively short lifetime.

According to the present invention, it has been found that metal boride catalyst incorporated into fuel cell electrodes provide excellent electro-chemical activity and have a long life upon exposure to corrosive conditions. Therefore, it is an object of the invention to provide improved fuel cell electrodes containing metal borides.

It is another object of the invention to provide a carbon substrate fuel cell electrode having a nickel boride catalyst incorporated therein.

It is another object of this invention to provide fuel cell electrodes comprising a compacted self-contained porous metal boride structure.

It is another object of this invention to provide an improved powdered-type fuel cell electrode comprising a metal boride catalyst.

It is another object of this invention to provide an improved fuel cell electrode comprising a metal boride catalyst, together with a second metal which will act as a promoter to increase the electro-chemical activity of the electrode.

It is another object of the invention to provide a method for producing metal blacks, in situ, within a porous structure without blocking of the pores.

It is still another object of this invention to provide an improved fuel cell having, as a component, an improved electrode comprising a metal boride catalyst.

These and other objects of the instant invention will become more clearly apparent from the following detailed description with particular emphasis upon the preferred embodiments.

Briefly, according to the present invention, a fuel cell electrode is constructed containing a metal boride as the catalytic material. The activated electrode can be prepared by numerous methods and can take any one of several forms. For example, a porous structure can be impregnated with a solution of a metal boride and reduced, or the metal boride can be precipitated onto an inert structure such as graphite, carbon, cellulosic products, or other suitable electrode support, from a solution of the metal boride, followed by drying. Additionally, the electrode can be used as a powdered-type electrode with particles of metal boride acting as the catalytic material, or the previously formed metal borides can be compacted and made up into self-contained porous structures by sintering. It may be preferred to employ a metal screen or a similar support in the sintered electrode to impart strength to the over-all structure.

The metal borides employed in the fuel cell electrodes of the present invention have the formulae MB, $MB_2$, $MB_4$, $MB_6$, and $M_3B_2$ where M is an element less electro-negative than boron. Preferably, M is a transition metal selected from Groups III–VIII of the Mendelyeev's Periodic Table. Of these metals, nickel and the Group VIII metals are preferred due in part to their high electro-chemical activity and, in the case of nickel, to its relatively low cost. The borides of the transition metals as a class have a refractory-like nature with high conductivity and catalytic activity combined with chemical inertness. More specifically, the transition metals having the greatest potential in the herein described electrodes are nickel, ruthenium, rhodium, palladium, osmium, iridium, and platinum.

The metal borides are prepared by various methods known in the art, including direct combination of the elements, reaction between metals and vapors of boron containing compounds (e.g., $BF_3$), electrolysis of fused borates and reduction of metal salts with aqueous alkali borohydrides. Apparently, however, as will be described more completely hereinafter, several of the precious metals will not form the boride when contacted with an alkali borohydride, but rather the borohydride functions primarily as a reducing agent to form the precious metal in highly divided form. However, where applicable, the reduction of a solution of a suitable salt of the metal, such as the nitrates and chlorides, by means of an aqueous solution of an alkali borohydride is highly desirable since the metal borides are obtained in the form of finely divided precipitate. As is apparent, the precipitation of the metal boride can be caused to occur in situ in a porous carrier or the metal borides can be precipitated, dried, compacted, and sintered to form a self-supporting structure. Additionally, as indicated hereinbefore, the metal boride can be employed directly as a powdered-type electrode. The type selected will depend on the end use of the fuel cell as well as upon other factors such as cost, the nature of the fuel and oxidant, and the electrolyte.

In the preparation of the metal boride, any water-soluble salt of any compound which will form a boride,, preferably the transition metals, is operative for purposes of the invention. The actual preparation of the borides is known in the art from standard inorganic textbooks and treatises.

Porous carbon structures provide an excellent base for fuel cell electrodes of the present invention in view of their relatively low cost and in that connecting pores of different size provide opportunity for a large number of contacts between the electrolyte and chemical reactants. The carbon structures provide a conductor from which free electrons released in the fuel cell reaction can be withdrawn from the cell. Although porous carbon structures are highly desirable, other porous structures can be employed including metal sinters as well as porous plastic materials. Additionally, it may be desirable to employ dissimilar materials in order that the two surfaces of the electrode will have different properties. Thus, the surface fronting the electrolyte desirably could be hydrophilic with the surface fronting the gaseous reactant being hydrophobic.

A suitable method for impregnating a carbon or other porous structure with the metal boride is carried out by soaking the porous structure in a solution of the metal boride for a period of time of from about 15 minutes to about 6 hours or more. The structure is then fully dried, preferably by heating in the range of from about 150 to 400° F. for a period of time of from about 2 hours to 24 hours. After drying, the temperature is raised to about 350 to 2,500° F. in an inert atmosphere for a period of about 2 to 6 hours to decompose the soluble salts of the metal borides to form the activating metal boride.

In instances where the metal boride can be formed from an alkali borohydride, the procedure is modified so that a soluble salt of the desired metal, for example, nickel chloride, impregnates the porous structure followed by the introduction of the alkali borohydride. The borohyrydride reacts with the nickel chloride salt precipitating nickel boride in a finely divided state.

Such electrodes may take on a variety of forms in accordance with the over-all design of the fuel cell. Thus, the electrode may comprise a hollow cylinder or plate-like structure which may be either flat, angular, or curbed. As apparent, it may be desirable at times to employ a metal support screen to provide rigidity to the electrode structure. In such instance, the metal boride powders can be pressed around the porous screen, or a suitable support screen can be sprayed with a solution of the metal boride and a suitable binding agent. After spraying, the entire structure can be pyrolized. The actual preparation of the metal sinters and carbon structures does not form a part of the instant invention and any of the methods known in the art can be selected.

Further according to this invention, it has been found that the presence of small amounts of "a promoter" will give even enhanced properties. The "promoter" which is to be added to the nickel boride electrode can be substantially any other catalytic material, such as chromium, cobalt, vanadium, manganese, and iron.

A further feature of the present invention is the ability to obtain a highly active electrode surface by forming a metal black within the body of a porous support, such as carbon, metal sinters, or plastic. Thus, the structure is impregnated with a salt of platinum, palladium, iridium, osmium, rhodium, or ruthenium followed by impregnation with an aqueous solution of an alkali borohydride at room temperature. The metal salt will form a voluminous black precipitate of the metal which is adherent to the porous support structure. Unlike nickel, cobalt, and other transition metal salts, rather than depositing the metal boride as would be expected, the pure metal phase is obtained. The precious metal black is in a highly activated form and does not block the pores of the structure. Apparently, the borohydride functions solely as a reducing like structure which may be either flat, angular, or curved. expected. An outstanding feature of the method is the formation of the black at low temperatures. Most techniques for depositing precious metals on substrates require the use of high temperatures. An exception to the requirement for high temperatures is the use of electro-deposition. However, when a black is layed down by electro-deposition, the deposit of the black occurs primarily on the surface of the substrate rather than in the internal pores of the porous body. Therefore, the simplicity of the present method, together with the ability to form the blacks at lower temperatures permitting their application to a host of supports including plastics and rubbers which cannot be subjected to high temperatures without damage, and the feature of depositing the black within the pores without plugging or blocking the pore openings, renders the method particularly noteworthy.

The quantity of the metal black deposited is not particularly critical. It has been found that improved fuel cell performance is obtained with the deposition of from 0.5 to 50 milligrams of black per square centimeter of electrode surface with the usual amount being no more than about 1–25 milligrams of black per square centimeter of surface due to economic considerations. From a practical standpoint, the amount of black applied is determined by the extent of the impregnation of the porous structure with the precious metal salt and the alkali borohydride. Preferably, the borohydride is employed in slight excess of that needed to react with the precious metal salts. The maximum permissible weight of reduced metal applied to he support is determined by practical considerations such as cost and pore blockage.

The electrodes of the instant invention can be employed in fuel cells using virtually any of the prior art electrolytes. As is known, for an efficient fuel cell, it is necessary that the electrolyte remain invariant and have a high ionic conductivity. The alkaline electrolyte such as the alkanolamines, potassium hydroxide, and the carbonates are particularly desirable. However, acid electrolytes such as sulfuric acid, phosphoric acid, etc., may be employed. Additionally, any of the commonly known fuels such as hydrogen, carbon monoxide, methanol propane, and kerosene can be employed in fuel cells utilizing the herein described electrodes. The electrodes with the aforesaid fuel can be utilized in fuel cell systems operating at virtually any temperature. Thus, the electrodes have demonstrated good electro-chemical characteristics at low temperatures and adidtionaly do not undergo unusual deterioration even at temperatures in the neighborhood of 700 to 1,000° C.

Having described the invention in general terms, the following examples are set forth to more particularly illustrate the invention. However, the examples are not meant to be limiting. Parts are by weight unless otherwise specified.

EXAMPLE I

A porous carbon having an average pore diameter of about 250 angstroms and an internal surface area, i.e., pore surface area, of 150 to 275 square meters per gram, was immersed in an aqueous 3% nickel chloride solution, containing 2% of chromic sulfate. The temperatures of the solution were raised to about 95–100° C. and maintained for a period of 15 minutes. The carbon structure was removed from the nickel bath and dried before being immersed in a solution of potassium borohydride. The borohydride solution was raised to approximately 45–50° C. with a precipitate of nickel boride being formed on the carbon substrate. After maintaining the carbon plate in the potassium borohydride solution for approximately 15 minutes, the structure was removed from the bath and dried by passing moderately heated inert gas (30–35° C.) over the plate. The porous plate after drying had a uniform coating of nickel boride throughout the internal surface area of the structure.

A fuel cell was constructed in a suitable housing employing a porous carbon plate as the cathode and the nickel boride activated carbon prepared above as the anode, with the electrodes being spaced five-eighths of an inch apart. The space between the electrodes was filled with an aqueous 35% solution of potassium hydroxide. Oxygen at ten inches of $H_2O$ was fed to the cathode and hydrogen at six inches $H_2O$ was fed to the anode. At 25° C., the cell provided an electrical output as follows:

| Current density, ma./cm.$^2$: | Voltage in volts |
|---|---|
| 4 | 0.80 |
| 9 | 0.71 |
| 15 | 0.61 |
| 30 | 0.49 |
| 50 | 0.47 |
| 78 | 0.18 |

The cell, when operated for prolonged periods of time, did not deteriorate and provided a steady electrical output.

EXAMPLE II

A 4% aqueous solution of potassium borohydride was slowly added to a 3% solution of nickel boride with stirring at room temperature. Upon contact of the potassium borohydride solution with the nickel boride, a black finely divided precipitate of nickel boride was formed. The nickel boride powder was collected, washed, and dried at 300° C. in an inert atmosphere.

A fuel cell was constructed in a suitable housing employing a porous carbon plate as the cathode and the powdered nickel boride prepared above, in a suitable mesh support, as the anode. The electrodes were spaced five-eighths of an inch apart with the space between being filled with an aqueous 40% potassium carbonate solution. Oxygen at seven inches water was fed to the cathode and hydrogen at nine inches water was fed to the anode. At 19° C., the cell provided 5 milliamps per square centimeter current density at 0.34 volt.

EXAMPLE III

A porous carbon activated with nickel boride, substantially identical to the structure described in Example I, was employed as the anode in a fuel cell having a suitable housing, a porous carbon plate as the cathode with the electrodes being spaced five-eighths of an inch apart. The space between the electrodes was filled with an aqueous 40% potassium carbonate solution as the electrolyte. Oxygen at eight inches water was fed to the cathode and hydrogen at eleven inches water was fed to the anode. At 80° C., the cell provided a steady current density of 10 milliamps per square centimeter at 0.18 volt.

EXAMPLE IV

Two porous carbons each having an average pore diameter of 250 angstroms and an internal surface area of 250–275 square meters per gram were vacuum impregnated with an aqueous solution of 5% rhodium chloride. The electrodes were dried and vacuum impregnated with a 10% aqueous solution of potassium borohydride. Immediate deposition of the rhodium black occurred at room temperature. The carbons were washed and dried.

A fuel cell was constructed in a suitable housing employing one carbon plate prepared as described above as the cathode and the second porous carbon prepared as described above as the anode. The electrodes are spaced five-eighths of an inch apart. The space between the electrodes was filled with an aqueous 35% solution of potassium hydroxide. Oxygen was fed to the cathode at six inches water and hydrogen was fed to the anode at six inches water. At 80° C., the cell provided an electrical output as follows:

| Current density ma./cm.$^2$: | Voltage in volts |
|---|---|
| 25 | 0.76 |
| 50 | 0.64 |
| 75 | 0.53 |
| 125 | 0.35 |

EXAMPLE V

A porous carbon having an average pore diameter of 250 angstroms and an internal surface area of 250–275 square meters per gram was vacuum impregnated with an aqueous solution of 5% platinum chloride. The porous carbon is dried and vacuum impregnated with a 10% aqueous solution of potassium borohydride. Immediate deposition of the platinum black occurs at room temperatures. The porous carbon is washed and dried.

A fuel cell was constructed in a suitable housing employing a porous carbon plate as the cathode and the activated carbon, described above, as the anode. The electrodes were spaced five-eighths of an inch apart. The space between the electrodes was filled with an aqueous 40% potassium carbonate solution. Oxygen at ten inches water was fed to the cathode and hydrogen at eight and one-half inches water was fed to the anode. At 22° C., the cell provided a steady current density of 25 milliamps per square centimeter at 0.39 volt.

In Examples I–III, the nickel boride catalyst can be replaced by other metal borides including borides of copper, cobalt, magnesium, platinum, palladium, rhodium, ruthenium, iridium, and osmium. Additionally, in Examples IV and V, the rhodium and platinum black can be replaced by other blacks including blacks of palladium, iridium, osmium, or ruthenium. The proper selection is within the ability of one skilled in the art having the foregoing specification as a guide.

The illustrative examples are given as preferred embodiments of the invention. However, the invention is not to be construed as limited thereby. It is possible to produce still other embodiments without departing from the inventive concept herein described.

It is claimed:

1. In a fuel cell comprising a housing, an electrolyte, a fuel electrode, and an oxidizing electrode, the improvement wherein at least one electrode contains at least catalytic amounts of a metal boride, said metal being a transition metal selected from Groups III–VIII of the Mendelyeev's Periodic Table.

2. The method for forming an electrode for use in a fuel cell comprising the steps of applying a uniform surface of metal black to a porous structure comprising impregnating a porous structure with a solution of a Group VIII transition metal salt and, thereafter, impregnating said porous structure with an alkali borohydride, whereby a coating of said transition metal black is formed in the internal pores of said structure.

3. The method of claim 2 wherein the method is carried at room temperature.

4. A fuel cell comprising at least two electrodes of opposite polarity and an electrolyte, at least one of said electrodes not being consumed during the electrolytic process of the device, said electrode comprising at least catalytic amounts of a metal boride, said metal being a transition metal selected from Groups III–VIII of the Mendelyeev's Periodic Table.

5. The fuel cell of claim 4 wherein the metal boride is nickel boride.

6. A fuel cell having a housing; anode and cathode electrodes mounted in said housing in spaced relation to each other; means for supplying a fuel to said anode; means for supplying an oxidant to said cathode; an electrolyte disposed between said electrodes; said anode comprising at least catalytic amounts of a nickel boride.

7. A fuel cell having a housing; two electrodes mounted in said housing in spaced relation to each other; means to supply a fuel to one of said electrodes; means to supply an oxidant to the other of said electrodes; an electrolyte disposed between said electrodes; and at least one of said electrodes comprising an electrically conductive porous support having randomly dispersed thereover and in the pores thereof nickel boride.

8. A fuel cell having a housing; an anode and a cathode electrode mounted in said housing in spaced relation to each other; an electrolyte disposed between said electrodes; means for supplying a fuel to the anode and means for supplying an oxidant to the cathode; and said cathode comprising an electrically conductive porous support having randomly dispersed thereover and in the pores thereof nickel boride.

9. In a fuel cell comprising a housing, an electrolyte, a fuel electrode, and an oxidizing electrode, the improvement wherein at least one electrode contains at least catalytic amounts of nickel boride.

References Cited

UNITED STATES PATENTS

| 3,183,123 | 5/1965 | Haworth | 136—120 XR |
| 3,183,124 | 5/1965 | Jasinski | 136—122 |
| 3,210,157 | 9/1965 | Lewis et al. | 252—432 |

FOREIGN PATENTS 127,242   8/1959   U.S.S.R.

WINSTON A. DOUGLAS, Primary Examiner

F. CRUTCHFIELD, Assistant Examiner

U.S. Cl. X.R.
117—169; 136—120

PO-1050
(5/69)

UNITED STATES PATENT OFFICE
CERTIFICATE OF CORRECTION

Patent No. 3,513,028        Dated May 19, 1970

Inventor(s) Mark Salomon

It is certified that error appears in the above-identified patent and that said Letters Patent are hereby corrected as shown below:

Column 4, line 20, delete "like structure which may be either flat, angular, or curved." and insert -- agent without actually forming the boride as would be"; column 4, line 48, delete "of" and insert -- to --; column 6, line 71, delete "canied" and insert -- carried out --.

SIGNED AND
SEALED
OCT 13 1970

(SEAL)
Attest:

Edward M. Fletcher, Jr.
Attesting Officer

WILLIAM E. SCHUYLER, JR.
Commissioner of Patents